United States Patent [19]

Vicari et al.

[11] Patent Number: 4,879,662

[45] Date of Patent: Nov. 7, 1989

[54] FLUID FLOW SELF CALIBRATION SCHEME

[75] Inventors: John J. Vicari; Peter J. Suttie, both of Rockford, Ill.

[73] Assignee: Sundstrand Corporation, Rockford, Ill.

[21] Appl. No.: 167,033

[22] Filed: Mar. 11, 1988

[51] Int. Cl.⁴ .............................................. G06F 25/00
[52] U.S. Cl. ............................... 364/510; 364/571.04; 73/3
[58] Field of Search ............... 364/510, 175, 165, 164, 364/571.06, 571.04, 558, 142, 431.02, 509; 73/197, 195, 861.42, 861.58, 3, 168

[56] References Cited

U.S. PATENT DOCUMENTS

| | | | |
|---|---|---|---|
| 3,608,572 | 9/1971 | Hass | 364/510 |
| 3,909,601 | 9/1975 | Yamawaki et al. | 364/175 |
| 4,149,254 | 4/1979 | Molusis | 364/510 |
| 4,277,832 | 7/1981 | Wong | 364/510 |
| 4,307,451 | 7/1981 | Zagranski et al. | 364/431.02 |
| 4,364,413 | 12/1982 | Bersin et al. | 137/624.2 |
| 4,527,600 | 7/1985 | Fisher et al. | 364/509 |
| 4,618,931 | 10/1986 | Miller et al. | 364/431.02 |
| 4,682,166 | 7/1987 | Takeuchi et al. | 340/825.5 |
| 4,714,005 | 12/1987 | Leemhuis | 91/361 |
| 4,720,800 | 1/1988 | Suzuki et al. | 364/510 |
| 4,720,801 | 1/1988 | Boll | 364/510 |
| 4,796,651 | 1/1989 | Ginn et al. | 364/510 |

OTHER PUBLICATIONS

"Control of Aircraft and Missle Power Plants", Sobey & Suggs ©1963, Wiley & Sons, pp. 6–7, 32–43.

Primary Examiner—Parshotam S. Lall
Assistant Examiner—S. A. Melnick
Attorney, Agent, or Firm—Antonelli, Terry & Wands

[57] ABSTRACT

A fluid system for calibrating a variable area metering valve during flight when the fluid receiver is not in operation employs several single point fixed calibration orifices that are sequentially used to establish a corresponding number of calibration points in a short time interval. The position of the metering valve movable element is stored in a memory of a microprocessor for each calibration point and the metering valve may thereafter be driven by the microprocessor to control with precision flow rates to the receiver without the need for a flow meter. Operation is free to bench calibration inaccuracies and possible drift due to mechanical wear.

8 Claims, 1 Drawing Sheet

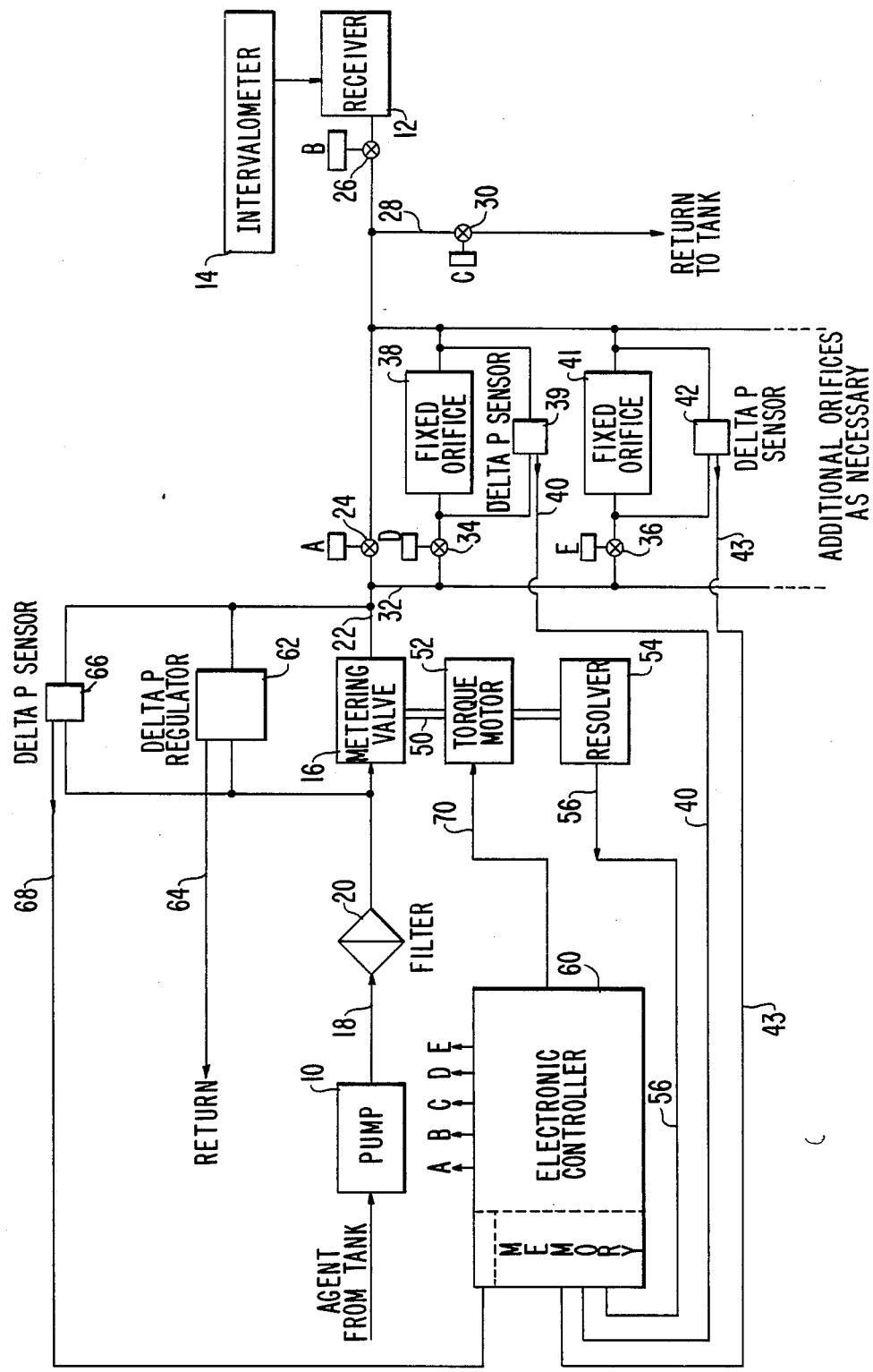

FLUID FLOW SELF CALIBRATION SCHEME

TECHNICAL FIELD

This invention relates to the control of the rate of fluid flow through a variable area metering valve which is calibrated with precision to obviate the need for flow meters. The invention is useful in flight vehicles where the calibration may be performed during flight in a short period just prior to operation.

BACKGROUND ART

It is difficult to obtain precise indications of flow rate through a variable area metering valve merely by measurement of the actual geometric opening of the valve not only because different types of valves have different flow characteristic curves relating percentage flow through the valve against percentage opening of the valve, as illustrated in Millar U.S. Pat. No. 4,581,707 granted Apr. 8, 1986, but changes in pressure and temperature alter the flow performance. In some installations, the prior art has employed a display to indicate whether the valve was closed or open together with a flow meter to determine flow rate. In Molusis U.S. Pat. No. 4,149,254 issued Apr. 10, 1979, a system is disclosed for periodically calculating gas being utilized while it is flowing through an orifice and for displaying operating and test parameters.

DISCLOSURE OF INVENTION

The present invention provides a precise and accurate control of the flow rate without the need for a flow meter. Merely by measuring the actual opening of the metering valve stored in a memory, a precise measured flow rate is controlled. During normal operation, fluid is provided to a receiver or utilization device from the fluid source under a substantially constant pressure through a variable area metering valve at a rate determined by the setting of the orifice opening within the metering valve that is controlled by a suitable motor. The motor is commanded to open or close the metering valve in such a way as to provide a predetermined rate of flow. The position of the metering valve operating shaft is monitored by a resolver.

The metering valve is calibrated during a time interval that the system is on stand-by, preferably under prevailing pressure and temperature conditions and with the exact fluid that will be the subject of future flow control. For example, calibration may be performed during a short period, of a minute or so during, flight. To effect calibration, the fluid is circulated through a flow rate calibration circuit and returned to the tank.

Calibratin may advantageously be effected by use of fixed calibration orifices each having a pressure drop sensor and acting as a single point flow meter. Multiple orifice/delta pressure sensor combinations, each having been accurately calibrated at a particular set point that is different for each sensor, are provided so that for a given pressure drop across each fixed orifice, the flow rate through that orifice is precisely known and the position of the metering valve recorded for each known flow rate. An accurate calibration curve for a particular metering system under actual operation conditions is thus provided and bench calibration inaccuracies ad possible drift due to mechanical wear are eliminated as problems.

These and other objects of the invention will become more fully apparent from the claims and from the description as it proceeds in connection with the drawing.

BRIEF DESCRIPTION OF DRAWING

The single figure of the drawing is a block diagram of the system incorporating the present invention.

DISCLOSURE OF INVENTION

The fluid employed in the system of the present invention is pressurized by pump 10 to a predetermined constant pressure and supplied to a receiver 12 which, in a flight vehicle such as an aircraft or space vehicle, may be operated on an intermittent basis either on demand or periodically as by an intervalometer 14. Where the fluid from pump 10 is utilized at spaced time periods, non-operational intervals are available for calibration in accordance with the present invention.

In the illustrated embodiment, control of flow rate is important and is achieved without the traditional flow meter. Instead, the metering valve 16 which is connected in the flow line between pump 10 and receiver 12 is calibrated so as to serve the dual function of control and measurement.

Metering valve 16 may be of any suitable variable area type valve. Input line 18 may include a filter 20 and the output line includes shut-off valves 24 and 26 which have operators with electrical control terminals A and B respectively. A drain line 28 is also provided with a cutoff valve 30 and operator with terminal C.

Between the metering valve 16 and shut-off valve 24 a fluid line is provided which has branches each with shut-off valves 34, 36 etc. that are connected to fixed orifice flow restrictors 38, 41, etc. Across each fixed orifice 38, 41, etc. is a pressure sensor 39, 42, etc. commonly known as a delta pressure sensor to accurately measure the pressure drop across its associated fixed orifice and produce an electrical signal on output lines 40, 43, etc. Each orifice, delta pressure combination has been accurately calibrated at a particular, different set point such that for a given pressure drop across the orifice, a flow through that orifice is precisely known.

An output line 46 is connected from each fixed orifice 38, 41, etc. to the drain line 28 and to the sump through valve 30 during the step of calibration. Valve 30 is closed except during calibration.

Metering valve 16 preferably is a sliding plate type of valve structure and has a shaft 50 driven by torque motor 52 which has a shaft position indicator such as resolver 54 that provides information concerning the angular position of shaft 50 and hence the position of the element which controls the size of the open flow area of the metering valve 16. An output signal on line 56 is supplied to an electronic controller unit or microprocessor 60 which reads the resolver output signal as one of its input signals.

A pressure drop regulator 62 is connected across the metering valve 16 to maintain a constant pressure drop between the inlet and the outlet of metering valve 16. Fluid line 64 of regulator 62 is a return line connected to the tank. A delta pressure sensor 66 is also connected across the metering valve 16 and the pressure drop regulator 62 to accurately measure the pressure drop across the metering valve 16. An output electrical signal on line 68 from the delta pressure sensor 66 is applied as an input to the electronic controller unit 60.

The electronic controller unit 60 has an output signal on line 70 which provides drive current for torque motor 52 to control the flow through metering valve 16 in accordance with instructions from the controller unit 60.

Output signals on terminals A, B, C, D and E of electronic controller unit 60 are connected to provide electrical signals which open and close the shut-off valves 24, 26, 30, 34 and 36.

When pressurized fluid is provided to receiver 12, shut-off valves 24, 26 are open and the other shut-off valves 30, 34, and 36 which are associated with the return flow line and the various fixed orifices 38, 41, etc. respectively are closed. Fluid provided to the receiver 12 is at a flow rate determined by the size of the variable orifice within the metering valve 16. The angular position of shaft 50 is controlled by the torque motor 52. The electronic controller unit 60 monitors the output signal from resolver 54 and provides commands to the torque motor 52 to achieve an opening that will produce the desired flow rate. However, the accuracy of the metering valve 16 is normally less than that necessary to guarantee that the flow rate to the receiver 12 is within acceptable tolerances.

Because there are time periods available when the receiver 12 does not require a flow of fluid, the calibration procedures next described are implemented when the system is "off line".

When receiver 12 does not require a flow of fluid, the two shut-off valves 24 and 26 are closed and shut-off valve 30 is opened by signals from the controller unit 60 on terminals A, B and C. One of the shut-off valves 34, 36 etc. associated with the fixed orifice 38, 41, etc. is opened. Although in the Figure only two fixed orifices 38, 41 are shown, it should be understood that many more fixed orifice configurations may be provided, the exact number depending upon the specific embodiment of the invention and on the range of flow rates where calibration points are required.

Initially, after shutting off flow to the receiver 12, the shut-off valve 34 is opened to permit a flow through fixed orifice 38 and back to the storage tank through flow line 28 and open valve 30. With only one fixed orifice configuration being provided with a fluid flow through the metering valve 16, the metering valve 16 is opened from an initially closed position to a position that achieves a preselected pressure drop across fixed orifice 38 that is sensed by the delta P sensor 39 to thereby cause a signal to be produced on lead 40 which is supplied to the electronic controller unit 60. The position of the metering valve 16 is simultaneously recorded by the signal on lead 56 from resolver 54 to thereby provide a set point.

Next, the shut-off valve 34 is closed and the shut-off valve 36 is opened. The metering valve 16 is then opened gradually until the delta P sensor 42 associated with fixed orifice 41 indicates that the flow through the second fixed orifice is precisely that flow which is equivalent to the flow rate for which fixed orifice 41 had been calibrated. At that point, the resolver reading on line 56 representing the position of the metering valve 16 is stored to provide a second set point. This procedure is continued for a plurality of fixed orifice configurations until a relationship between actual flow rate and resolver reading is obtained over the desired range of flow rates and thus provide information corresponding to a calibration curve.

The electronic controller unit 60 has a number of readings for the resolver 54 with each resolver reading being associated with a specific flow rate that has been accurately calibrated while the vehicle is in flight. Following this self calibration procedure, all of the shut-off valves associated with the fixed orifice configurations are closed and the shut-off valves associated with the receiver are opened so that when required, fluid can be provided to receiver 12 from the pressurized fluid source 10. Using the self-calibration readings for the resolver, the torque motor 52 can be commanded to achieve resolver readings associated with specific accurate flow rates to the metering valve 16. The self-calibration procedure can be performed periodically so that the metering valve can be used to provide flow rates at an accuracy level that exceeds the normal accuracy of the metering valve 16.

While only a single embodiment of the present invention has been described, variations and modifications will become apparent to those skilled in this art. It should therefore be understood that the foregoing description is intended to be illustrative only and that all variations and modifications which fall within the scope of the appended claims are intended to be covered thereby.

What is claimed is:

1. A method of providing an in-flight accurate fluid flow rate calibration curve for a metering system comprising:

providing pressurized fluid for utilization by a receiver through conduits including a first shut-off valve that is intermittently operated during flight and a variable area metering valve;

providing a plurality of fixed calibration orifices, each with a pressure drop sensor and calibrated at a particular, different set point such that for a given pressure drop across the orifice the flow rate through that orifice is precisely known;

supplying said pressurized fluid through said variable area metering valve to a selected one of said fixed calibration orifices in sequence during flight while said first shut-off valve is closed; and recording the precise position of said variable area metering valve in the memory correlated with the known flow rates associated with each of said calibration orifices for subsequent retrieval and use during flight for controlling said variable area metering valve to regulate the flow rate to said receiver.

2. In a flight vehicle having a pressurized fluid source, a variable area metering valve including a driving torque motor and shaft angular position indicative means associated therewith, a receiver adapted to utilize pressurized fluid at a rate determined by said metering valve at predetermined time periods that are separated by non-operational intervals, and means for calibrating said metering valve while the vehicle is in flight during an interval of said receiver non-operation including a plurality of fixed orifice flow restrictors each with a pressure drop sensor connected there across by a method comprising the steps of:

sequentially connecting said variable area metering valve in series with different ones of said fixed orifice flow restrictors during a non-operational interval;

adjusting the variable area meter valve by said torque motor to obtain a known flow rate as determined by each of said fixed orifice flow restrictors;

recording in a sequential manner a plurality of output signals from said shaft position indicating means with each output signal corresponding to a flow rate determined by one of said fixed orifice flow restrictions to produce in a memory a plurality of calibration points of metering valve positions versus fluid flow rate; and controlling the rate of fluid flow to the receiver in the time period next following the recording step based on said calibration points thereby avoiding bench calibration inaccuracies and drift due to mechanical wear.

3. In a flight vehicle, a fluid flow self-calibration system comprising:

a pressurized fluid source;

a variable area metering valve;

a receiver adapted to utilize pressurize fluid at predetermined time periods that are separated by non-operational intervals;

means for transferring fluid from said source to said receiver at a flow rate determined by the variable area metering valve; and means for calibrating said metering valve while the vehicle is in flight during an interval of receiver non-operation comprising:

a torque motor and shaft angular position indicating means associated with said variable area metering valve;

a plurality of fixed orifice flow restrictors each with a pressure drop sensor connected there across;

means for sequentially connecting said variable area metering valve in series with different ones of said fixed orifice flow restricators;

means including the torque motor and shaft angular position indicating means for recording the position of said variable area metering valve to obtain sequentially a series of set points corresponding to flow rates, the magnitude of each flow rate at a set point being determined by the known flow rate at each of said fixed orifice flow restrictors; and means for controlling the rate of fluid flow to the receiver during a time period next following the operation of the valve position recording means in accordance with the recorded set points.

4. The calibration system of claim 3 wherein said recording means is associated with an electronic controller having a memory and the system further including means for connecting an output signal from said shaft position indicating means to said memory, means for connecting an electrical signal from each of said pressure drop sensors to said memory for providing signals corresponding to respective set points for causing a series of shaft position indication means signals corresponding to the different set points to be recorded in a sequential manner.

5. A fluid flow self calibration system comprising:

a source of pressurized fluid;

a utilization device adapted to utilize said pressurized fluid from time to time in periods that are separated by non-operational intervals;

a fluid conduit connected between said source and said utilization device including a first shut-off valve;

a variable area metering valve connected in said fluid conduit with an inlet end connected to said source of pressurized fluid and an outlet end connected to said shut-off valve;

means for calibrating said metering valve during a non-operational interval when supplied with said pressurized fluid and the shut-off valve is closed comprising:

a return line including a second shut-off valve connected between said fluid conduit and a sump;

a plurality of fixed calibration orifices connected in parallel between the outlet end of said metering valve and said return line with each orifice having a different area such that for a given pressure drop across the orifice, the flow rate through that orifice is precisely known;

a normally closed valve associated with each fixed calibration orifice;

means for sequentially opening each of said normally closed valves while the pressure source is operating to obtain through said metering valve flow of the fluid from the fluid pressure source at a rate as determined by the area of each fixed calibration orifice associated with the open one of said normally closed valves;

a controller including a memory unit;

a resolver connected to the metering valve for producing a signal corresponding to a metering element position in said variable area metering valve;

means for transmitting said resolver signals to the a memory unit in said controller; and means for recording in the memory information related to a plurality of positions of the metering valve element where each position corresponds to a different predetermined flow rate when one of said normally closed valves is open to establish a precisely calibrated set point, said controller thereafter containing information corresponding to a calibration curve composed of a plurality of said set points in the controller memory unit of metering valve element position verses fluid flow rate.

6. The calibration system of claim 5 wherein said shut-off valves and said normally closed valves are electrically operated and the system further comprises means in the controller for producing electrical signals for controlling the opening and closing of all of said valves.

7. The calibration system of claim 5 wherein the fluid conduit contains a third shut-off valve between said metering valve and said first mentioned shut-off valve and the return line is connected to said fluid conduit at a position between said first and third shut-off valves.

8. The calibration system of claim 7 wherein said shut-off valves and said normally closed valves ar electrically operated and the system further comprises means in the controller for producing electrical signals for controlling the opening and closing of all of said valves.

* * * * *